UNITED STATES PATENT OFFICE.

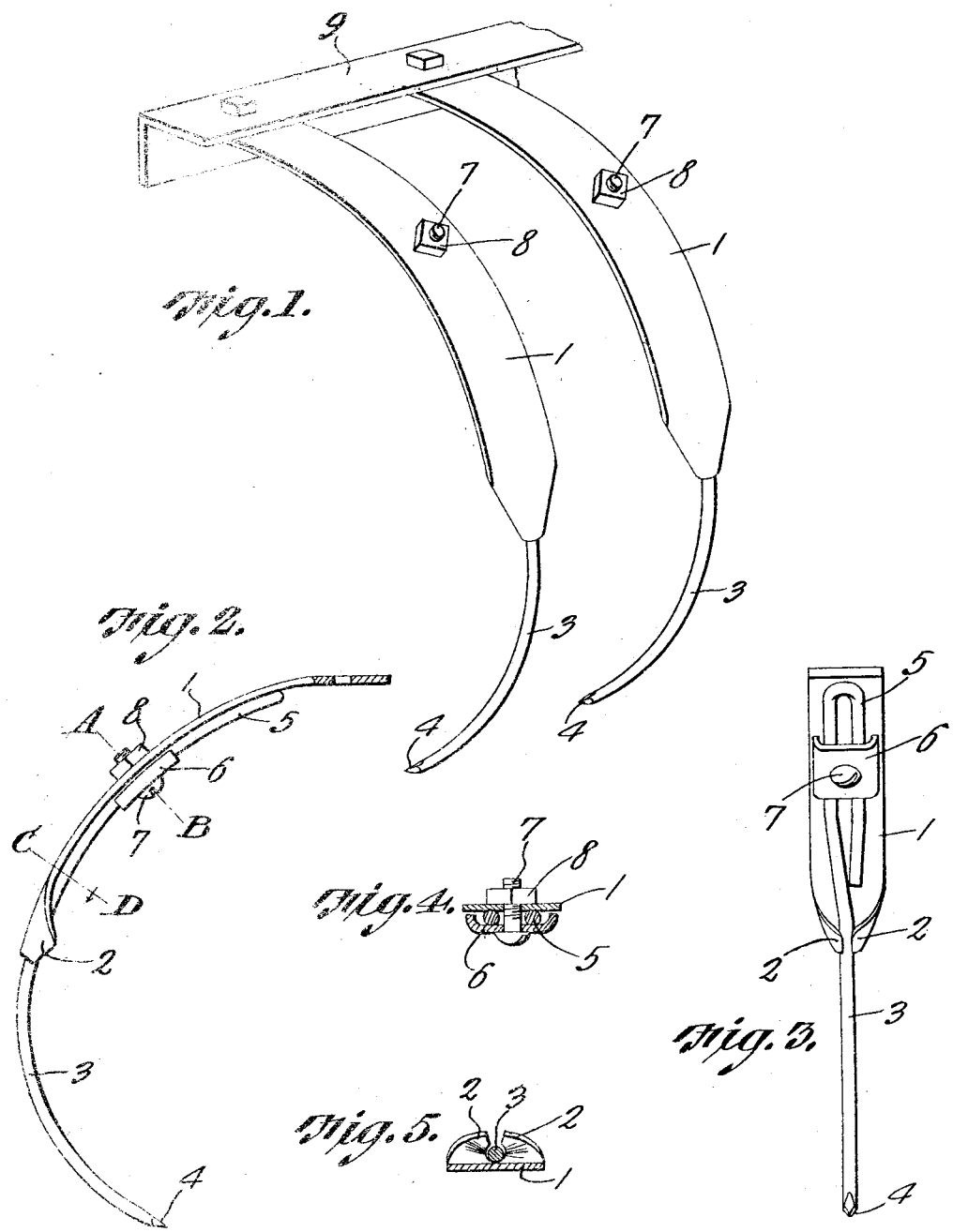

HARRY M. GOODING, OF ATTICA, OHIO.

SPRING-TOOTH.

1,185,498.

Specification of Letters Patent.   Patented May 30, 1916.

Application filed March 8, 1916. Serial No. 82,899.

*To all whom it may concern:*

Be it known that I, HARRY M. GOODING, a citizen of the United States, residing at Attica, in the county of Seneca and State of Ohio, have invented a new and useful Spring-Tooth, of which the following is a specification.

This invention relates to a spring tooth for use in connection with weeders, scarifiers and the like, one of the objects being to provide a spring tooth which is adjustable longitudinally, thereby to vary its degree of flexibility to meet different conditions, and which is likewise adjustable longitudinally to compensate for wear.

A further object is to provide a tooth which can be readily detached for the purpose of sharpening it.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a perspective view of teeth embodying the present improvements. Fig. 2 is a side elevation of a tooth, a portion being broken away. Fig. 3 is a front elevation of the tooth. Fig. 4 is a section on line A—B Fig. 2. Fig. 5 is a section on line C—D Fig. 2.

Referring to the figures by characters of reference 1 designates the relatively fixed or upper member of the tooth, the same being preferably formed of a flat sheet of metal bowed longitudinally and having its free corner portions turned inwardly to provide guide wings 2. The lower or active member of the tooth is formed of suitable spring wire and has been shown at 3. This member has its lower or free end sharpened as at 4 and is bowed from end to end, an intermediate portion of the member extending between the guide or restraining wings 2. The upper portion of the wire forming the lower member of the tooth is bent to form an elongated loop 5 which fits snugly against the lower or concave face of the member 1 and straddling this loop is a yoke 6 adapted to be held in place by a bolt 7 which extends through the loop and also through the member 1, said bolt being secured in place in any manner desired, as by means of a nut 8.

It will be obvious that when the bolt 7 is tightened the yoke 6 will bind on the loop 5 and clamp the loop upon the member 1. Thus the member 3 will be held against longitudinal movement relative to the member 1. Loop 5 prevents rotation of the member 3. As the point of the tooth wears away, the bolt 7 can be loosened and the tooth member 3 moved downwardly to compensate for the wear. Should it be desired to lengthen the tooth it is merely necessary to increase the distance between the free end of the member 1 and point 4. It will be noted that the tooth is curved from one end to the other and that the upper portion thereof, which is subjected to the greatest strain, is backed or reinforced by the member 1. Member 1 can be secured to a supporting structure, such as a cross bar 9 of a frame.

What is claimed is:—

1. A spring tooth including a relatively broad arcuate upper member having guides at the free end portion thereof, a lower arcuate member adjustably mounted between the guides and extending along the concave face of the upper member, said lower member having an elongated loop at its upper end, and means engaging the loop and the upper member for holding said members against relative sliding movement.

2. A spring tooth including a relatively broad bowed upper member, guides depending from the free end portion thereof, an arcuate lower member adjustable longitudinally between the guides and extending therebelow, the upper portion of said lower member bearing against and being reinforced by the upper member, there being an elongated loop at the upper end of the lower member, a yoke straddling the loop, and means extending through the yoke, loop and upper member for binding the members together.

In testimony that I claim the foregoing as my own, I have hereto affixed my signature in the presence of two witnesses.

HARRY M. GOODING.

Witnesses:
J. F. BOLLINGER,
M. A. JORDAN.